Patented Apr. 6, 1943

2,315,580

UNITED STATES PATENT OFFICE 2,315,580

MANUFACTURE OF PHYTYL BROMIDE

Robert Behnisch, Wuppertal-Elberfeld, Germany, assignor to Winthrop Chemical Company, Inc., New York, N. Y., a corporation of New York No Drawing. Application February 27, 1940, Serial No. 321,067. In Germany March 21, 1939

4 Claims. (Cl. 260—654)

This invention relates to the manufacture of phytyl bromide.

The 1-brom-3,7,11,15-tetramethyl-hexadecene-2 which in general is called phytyl bromide has been prepared by reacting upon phytol with phosphorus tribromide at the temperature of minus 10° C. in a manner similar to that by which farnesylbromide has been obtained from farnesol. This process requires the use of phosphorus tribomide has the additional disadvantage that the reaction product contains impurities, particularly phosphorus compounds, which are difficult to separate.

In accordance with the present invention phytyl bromide is obtainable in a very convenient manner by reacting upon phytol with concentrated bromine-free aqueous hydrobromic acid solution. In this reaction surprisingly no hydrogen bromide is added on at the double-bond of the phytol. The reaction proceeds very readily even at ordinary temperature without the formation of by-products, so that the yield corresponds nearly to the theoretical. An aqueous hydrobromic acid solution of a specific gravity of about 1.5 is advantageously used as concentrated hydrobromic acid. A phytyl bromide is thus obtained in such a state of purity that it may be used directly for the synthesis of vitamin E.

The invention is illustrated by the following example without, however, being restricted thereto:

Example 100 grams of phytol are vigorously stirred for 8 hours at room temperature with 1.000 ccs. of colorless hydrobromic acid (specific gravity =1.5). When the reaction has finished, the hydrobromic acid solution is separated from the reaction product which forms an oily layer. The oily layer is washed several times with water containing pieces of ice and is dried, if desired after the addition of a solvent, by means of sodium sulfate. Phytyl bromide is obtained in the nearly theoretical yield as a light, colorless oil which readily dissolves in the usual organic solvents, but which is insoluble in water. It boils at 0.1–0.2 mm. pressure at a temperature of 130–140° C. in the heating-bath. Overheating should be avoided, so that no hydrogen bromide is split off during the distillation.

I claim:

1. The process which comprises reacting upon phytol with concentrated bromine-free aqueous hydrobromic acid.

2. The process which comprises reacting upon phytol with bromine-free aqueous hydrobromic acid solution of a specific gravity of about 1.5.

3. The process which comprises reacting upon phytol with concentrated bromine-free aqueous hydrobromic acid solution at ordinary temperature.

4. The process which comprises reacting upon phytol with bromine-free aqueous hydrobromic acid of a specific gravity of about 1.5 at ordinary temperature.

ROBERT BEHNISCH.